(12) United States Patent
Devarajan et al.

(10) Patent No.: US 8,706,486 B1
(45) Date of Patent: Apr. 22, 2014

(54) VOICE DATA LEAKAGE DETECTION AND PREVENTION SYSTEMS

(75) Inventors: Ganesh Devarajan, Phoenix, AZ (US); Don Lebert, Phoenix, AZ (US); Todd Redfoot, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 251 days.

(21) Appl. No.: 13/331,570

(22) Filed: Dec. 20, 2011

(51) Int. Cl.
*G06F 17/21* (2006.01)

(52) U.S. Cl.
USPC .......................................... 704/235

(58) Field of Classification Search
USPC .......................................... 704/235
See application file for complete search history.

(56) References Cited

U.S. PATENT DOCUMENTS

| | | |
|---|---|---|
| 6,359,976 B1 | 3/2002 | Kalyanpur et al. |
| 6,381,306 B1 | 4/2002 | Lawson et al. |
| 6,829,230 B1 | 12/2004 | Tiuri |
| 7,653,302 B2 | 1/2010 | Limberis et al. |
| 8,028,030 B2 * | 9/2011 | Edlund et al. ............... 709/206 |
| 8,041,716 B2 * | 10/2011 | Daigle et al. ................ 707/728 |
| 8,363,098 B2 * | 1/2013 | Rosener et al. ............... 348/77 |
| 8,382,590 B2 * | 2/2013 | Stivoric et al. ............... 463/36 |
| 8,406,141 B1 * | 3/2013 | Couturier et al. ............ 370/241 |
| 2002/0124057 A1 | 9/2002 | Besprosvan |
| 2007/0030842 A1 | 2/2007 | Borden et al. |

* cited by examiner

*Primary Examiner* — Susan McFadden
(74) *Attorney, Agent, or Firm* — Karl A. Fazio

(57) ABSTRACT

An exemplary system for detecting and preventing voice data leakage may comprise one or more servers running a packet payload converter module, a transcript generator module, and a detection logic module. The packet payload converter module may receive VoIP packets, convert them to a digital audio file, and write the digital audio file to a media database. The transcript generator module may read the digital audio file from the media database, convert it to a text file, and write the text file to a transcript database. The detection logic module may read the text file from the transcript database, parse it into a plurality of keywords, determine whether the plurality of keywords contain one or more target keyword, and, if so, transmit a report to an events database.

21 Claims, 6 Drawing Sheets

US 8,706,486 B1

VOICE DATA LEAKAGE DETECTION AND PREVENTION SYSTEMS

CROSS REFERENCE TO RELATED PATENT APPLICATIONS

This patent application is related to U.S. patent application Ser. No. 13/331,710 entitled: "VOICE DATA LEAKAGE DETECTION AND PREVENTION" concurrently filed herewith and also assigned to Go Daddy Operating Company, LLC.

FIELD OF THE INVENTION

The present inventions generally relate to network security and, more particularly, systems and methods for detecting and preventing voice data leakage.

SUMMARY OF THE INVENTION

An example embodiment of a system for detecting and preventing voice data leakage may comprise one or more servers communicatively coupled to a network running a packet payload converter module, a transcript generator module, and a detection logic module. The packet payload converter module may be configured to receive a plurality of VoIP packets, convert the VoIP packets to a digital audio file, and write the digital audio file to a media database running on the one or more servers. The transcript generator module may be configured to read the digital audio file from the media database, convert the digital audio file to a text file, and write the text file to a transcript database running on the one or more servers. The detection logic module may be configured to read the text file from the transcript database, parse the text file into a plurality of keywords, determine whether the plurality of keywords contain one or more target keyword, and, if so, transmit a report to an events database running on the one or more server.

An example embodiment of a method of detecting and preventing voice data leakage may comprise the steps of receiving a plurality of VoIP packets, converting the VoIP packets to a digital audio file, converting the digital audio file to a text file, parsing the text file into a plurality of keywords, determining whether the plurality of keywords contains one or more target keywords, and, if so, generating a censored plurality of VoIP packets representing the conversation that excludes the one or more target keywords and transmitting the censored VoIP packets to a recipient.

The above features and advantages of the present inventions will be better understood from the following detailed description taken in conjunction with the accompanying drawings.

DETAILED DESCRIPTION

Figure 1:
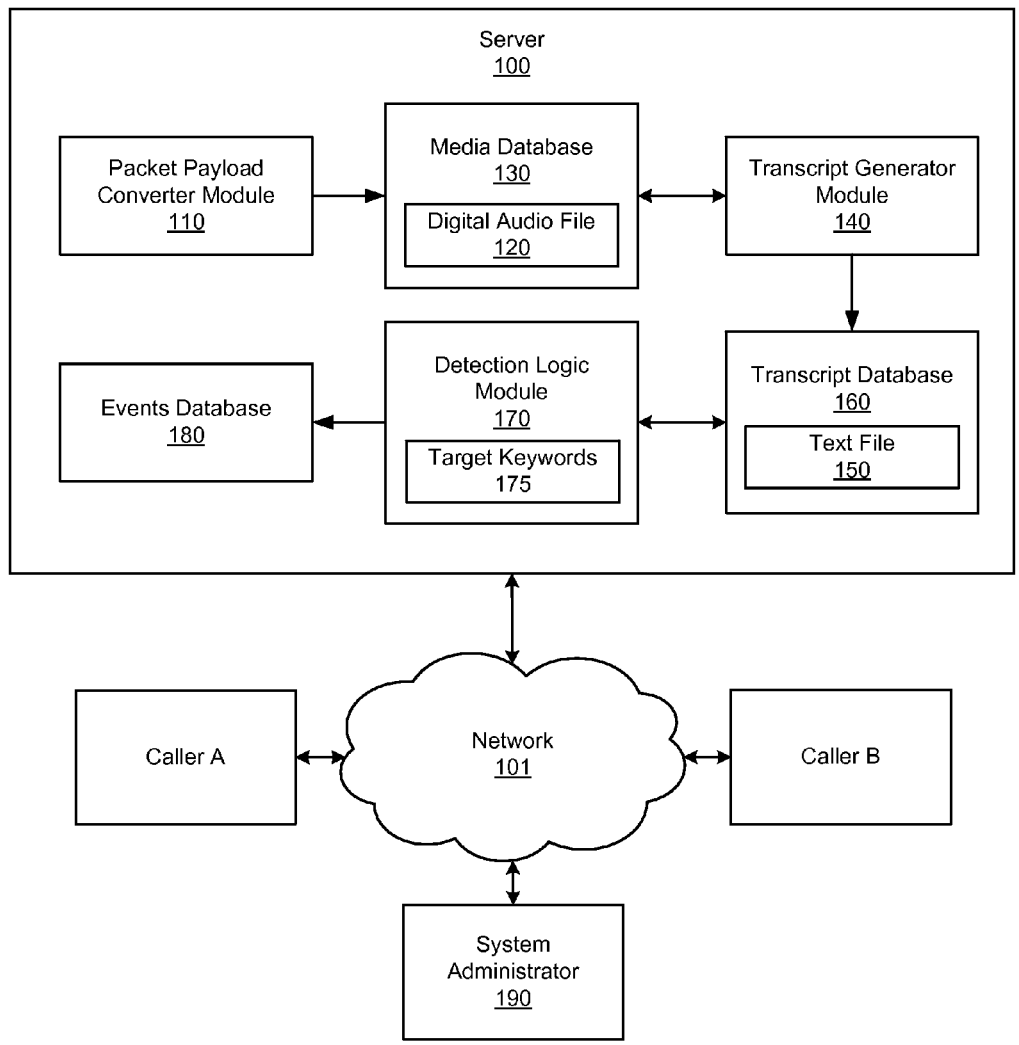
FIG. 1 illustrates a possible embodiment of a system for detecting and preventing voice data leakage.

The present inventions will now be discussed in detail with regard to the attached drawing figures, which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

Data Leak Prevention (DLP) is the practice identifying and tracking sensitive data in a network, ensuring that only authorized network users have access to such sensitive data, and minimizing the probability that such sensitive data is leaked beyond such authorized network users. As a non-limiting example, sensitive data may comprise any information that an organization should maintain securely, perhaps by obligation of law or policy. Examples of sensitive data may include personally-identifiable information, financial information, or medical records.

Presently-existing DLP systems and methods focus on identifying, monitoring, and protecting data as it is electronically stored (e.g., storage or "data at rest" DLP), transmitted (e.g., network or "data in motion" DLP), or processed (e.g., endpoint or "data in use" DLP). Such methodologies identify data leaks through content inspection and/or contextual analysis.

Applicant has determined, however, that presently-existing DLP systems and methods may be bypassed simply by transmitting sensitive information via telephone, thereby bypassing the electronic storage, transmission, and processing systems monitored by DLP methods. Presently-existing systems and methods therefore do not provide optimal means for detecting and preventing voice data leakage.

FIG. 1 illustrates an embodiment of a system for detecting and preventing voice data leakage that may comprise one or more servers 100 communicatively coupled to a network 101 running a packet payload converter module 110, a transcript generator module 140, and a detection logic module 170.

Servers 100 (and/or any other server described herein) may comprise any computer or program that provides services to other computers, programs, or users either in the same computer or over a computer network 101. As non-limiting examples, the one of more server 100 could be application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, or any combination thereof).

Servers 100 may comprise a computer-readable storage media storing instructions that, when executed by a microprocessor, cause the server 100 to perform the steps for which it is configured. The computer-readable media may comprise any data storage medium capable of storing instructions for execution by a computing device. It may comprise, as non-limiting examples, magnetic, optical, semiconductor, paper, or any other data storage media, a database or other network storage device, hard disk drives, portable disks, CD-ROM, DVD, RAM, ROM, flash memory, and/or holographic data storage. The instructions may, as non-limiting examples, comprise software and/or scripts stored in the computer-readable media that may be stored locally in the server or, alternatively, in a highly-distributed format in a plurality of computer-readable media accessible via the network 101, perhaps via a grid or cloud-computing environment.

The example embodiments illustrated herein place no limitation on network 101 configuration or connectivity. The network 101 may comprise any collection of links and nodes (e.g., multiple computers and/or other devices connected together) arranged so that information may be passed from one part of the network to another over multiple links and through various nodes. Thus, as non-limiting examples, the network 101 could comprise the Internet, the public switched telephone network, the global Telex network, computer networks (e.g., an intranet, an extranet, a local-area network, or a wide-area network), wired networks, wireless networks, or any combination thereof.

System components may be communicatively coupled to the network 101 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The packet payload converter module 110 may comprise software and/or scripts that may be stored in the memory of—and run on—at least one server computer 101 and may contain instructions that, when executed by the server computer's 101 microprocessor, cause the microprocessor to receive a plurality of Voice over Internet Protocol (VoIP) packets, convert the VoIP packets to a digital audio file 120, and write the digital audio file 120 to a media database 130 running on the one or more server 100.

The VoIP packets may comprise any Internet telephony format or type, perhaps (as illustrated in FIG. 1) one representing a conversation between Caller A and Caller B. The illustrated embodiments place no limitation on the type of VoIP-related communication that may be processed by the systems and methods illustrated herein. For example, any audio, video, and/or instant messaging communications transmitted in (or convertible to) packet format may be processed.

As a specific, non-limiting example, the VoIP packets may comprise the digital output of a VoIP Private Branch Exchange (PBX) within an organization, perhaps communicatively coupled to the network 101 or running on the server 100. The VoIP PBX may receive an incoming call (e.g., from Caller B), perhaps from the Public Switched Telephone Network (PSTN). The PBX may convert the incoming call to Real-Time Transport Protocol (RTP) format (or any other format supported by VoIP or other Internet telephony protocols), which may comprise a standardized packet format for delivering audio over IP networks. Thus, the PBX may convert an incoming call into a plurality of data packets, perhaps in RTP format, that comprise a digital representation of a conversation between, for example, Caller A and Caller B. Each packet may comprise a header (e.g., source and destination IP address information) and a payload (e.g., digital audio data representing parts of the conversation).

The packet payload converter module 110 may receive the packets, perhaps directly from the PBX in real time, and convert them into a digital audio file 120. As a non-limiting example, the packet payload converter module 110 may extract a plurality of digital audio data from the payloads of the RTP packets and reconstruct the conversation by writing the digital audio data extracted from numerous packets to one or more digital audio file 120, which may comprise an digital reconstruction of the entire (or part of) the telephone conversation. The illustrated embodiments place no limitations on audio file types that may be used including, but not limited to those using uncompressed audio formats e.g., (WAV, AIFF, or AU), those using lossless compression (e.g., MPEG-4, M4A, or FLAC), and/or those using lossy compression (e.g., MP3).

The audio file 120 then may be written to a media database 130, perhaps running on the server 100. The media database 130 may store numerous digital audio files 120, perhaps received from the packet payload converter module 110. It (and/or any other database described herein) may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future.

The transcript generator module 140 may be configured (e.g., programmed) to read the digital audio file 120 from the media database 130, convert the digital audio file 120 to a text file 150, and write the text file 150 to a transcript database 160 running on the one or more server 100. The audio file 120 may be converted to a text file 150 by any known speech-to-text system or methodology including, but not limited to those provided by WAV to Text or DRAGON DICTATION (e.g., DRAGON NATURALLY SPEAKING). The transcript generator module 140 may generate the text file 150 itself or, alternatively, receive the text file 150, from a web service responsive to transmitting the digital audio file 120 for conversion to the text file 150. The transcript generator module 140 then may write the text file 150 to the transcript database 150.

The detection logic module 170 may be configured (e.g., programmed) to read the text file 150 from the transcript database 160 and parse the text file 150 into a plurality of keywords. Parsing is the process of analyzing a sequence of tokens to determine its grammatical structure with respect to a given formal grammar. Parsing transforms input text into a data structure, such as the keywords used here. As a non-limiting example, if a text file 150 contains the following sentence: "John Doe's social security number is 123-45-6789," the detection logic module may parse the sentence into, among others, the keywords "John Doe," "social security number," and/or "123-45-6789."

The text file 150 may be parsed using any parsing methodology known in the art including, but not limited to, top-down parsing and/or bottom-up parsing. The parsing process also may include glyph or character substitution (i.e., identifying typographically improper characters and substituting characters that result in potentially-meaningful keywords). For example, the parsing process may replace the phrase "one one two" in a social security or credit card number to "112," resulting in more effective keyword parsing because "112" is more legible and/or understandable in the social security or credit card number context than "one one two."

The detection logic module 170 also may be configured (e.g., programmed) to determine whether the text file contains one or more target keyword 175. As non-limiting examples, target keywords 175 may comprise any word, term, phrase, sentence, number, and/or set of characters. For example, the target keywords 175 may comprise a personally-identifiable information, a credit card number, a social security number, a bank account number, a customer information, a name, an address, a phone number, an organizational secret, a curse word, a trade secret, an illegal activity, an improper activity, a medical information, a financial, or an accounting information.

In one example embodiment, target keywords 175 may be received from a system administrator 190, who may comprise an individual within an organization responsible for its DLP. As a non-limiting example, a system administrator 190 may access the illustrated system, perhaps via a client computer, and log into a control panel configured to allow the system administrator 190 to enter target keywords 175 that the illustrated system should search for.

If the detection logic module 170 locates a target keyword 175 in the text file 150, it may transmit a report to an events database 180, perhaps running on the one or more server 100. As a non-limiting example, the report may comprise any data associated with the identified target keyword 175 including, but not limited to a source phone number, a destination phone number, an internet protocol address, a time, a keyword, an audio file, or the complete text file associated with said conversation from which the text file was generated.

In one example embodiment, a system administrator 190 may access the report stored in the events database 180, perhaps via a client computer, and review its contents (that may include time or date information, the phone numbers of Callers A and B, the IP addresses of their telephones, and/or the located target keyword 175), listen to an audio clip of the portion of the conversation containing the target keyword 175, and/or read the text file.

Figure 2A:
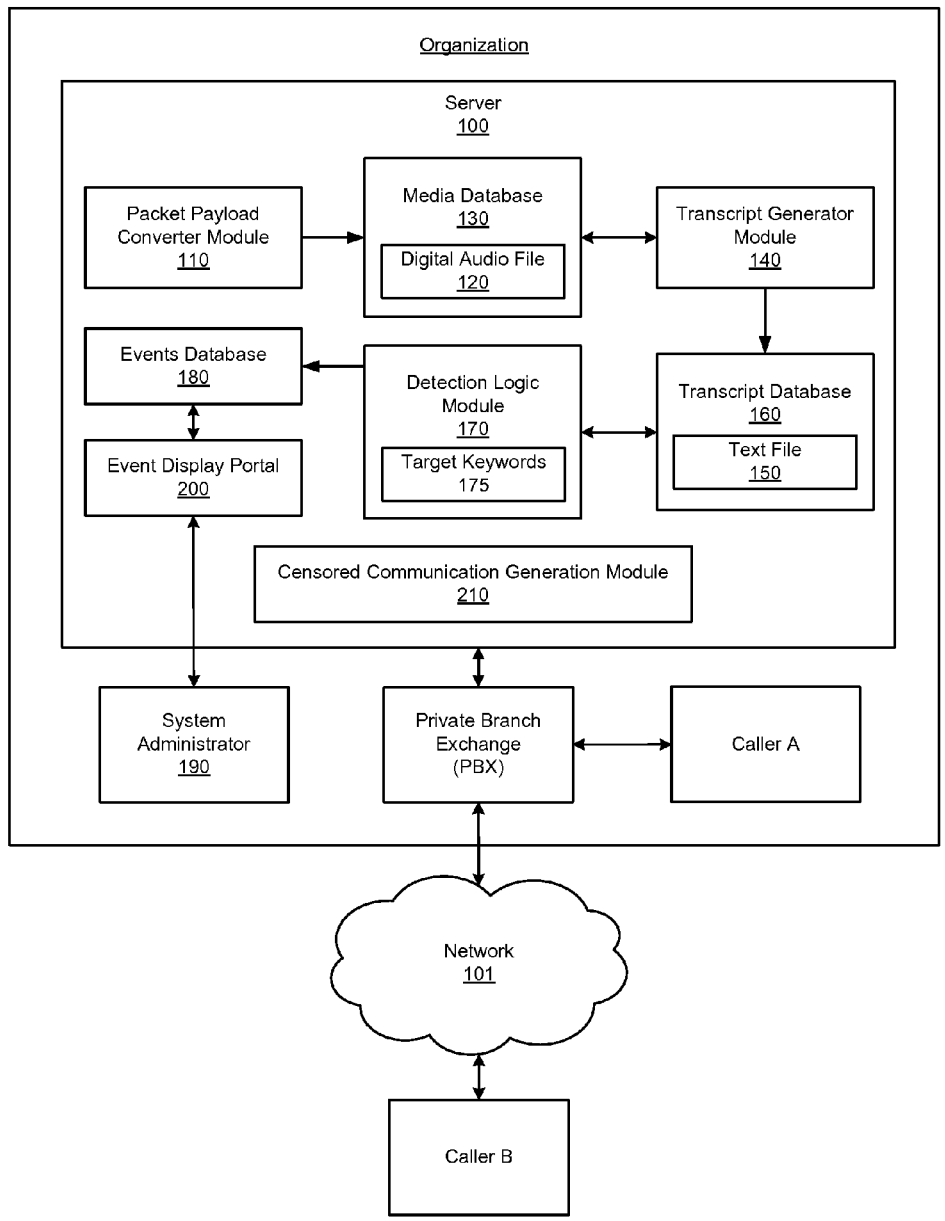
FIG. 2a illustrates a possible embodiment of a system for detecting and preventing voice data leakage.

FIG. 2*a* builds upon the embodiment illustrated in FIG. 1 and illustrates a system operated by an organization (e.g., a company, an educational or governmental institution, or any organization having a computer network storing, transmitting, or processing data) further comprising a censored communication generation module 210 configured (e.g., programmed) to generate a censored plurality of VoIP packets that excludes one or more VoIP packets corresponding to said one or more target keywords 175. This may be accomplished by identifying those packets that carried data associated with the target keyword 175 and deleting those packets from the plurality of VoIP packets transmitted to the receiving caller.

For example, when the packet payload converter module 110 converts the incoming VoIP packets to a digital audio file 120, it may retain in storage the original VoIP packets representing the conversation. The digital audio file 120 may include data (e.g., packet start and end markers for associated payload data) enabling the system to identify the packets associated with various sections of the digital audio file 120. When the detection logic module 170 locates target keywords 175 in the text file 150, the corresponding packets may be located and perhaps deleted. Alternatively, the censored communication generation module 210 may substitute "silent packets" (e.g., properly-addressed packets with no audio payload) for the packets corresponding to the target keywords 175 located in said text file. In such an embodiment, the recipient (e.g., Caller A or B) may receive an audio signal wherein the target keywords 170 are not represented (i.e., not heard by the recipient). The system may transmit the censored plurality of VoIP packets (e.g., without the packets corresponding to the located target keywords 175) to a recipient, such as Caller A or B. This process may occur in real time, enabling live censoring of ongoing conversations.

FIG. 2*a* also illustrates an event display portal 200 that may run on the server 100 and may be communicatively coupled to the events database 200. This portal 200 may comprise a display webpage or website wherein the system administrator 190 (perhaps after being properly authenticated) may view incident reports stored in the events database 180, listen to audio clips of the conversation (perhaps the portion containing the target keywords 175), and review the text file 150 comprising a transcript of at least part of the conversation. The event display portal 200 also may be configured (e.g., via data fields or drop-down boxes on a webpage) to allow the system administrator 190 to enter target keywords 175 that the illustrated system should search for. The event display portal 200 also may allow the system administrator 190 to enter a time frame before and/or after any target keywords 175 he would like to have censored from the conversation (e.g., 2 seconds) to ensure any information related to a located target keyword is flagged or censored from the conversation.

Figure 2B:
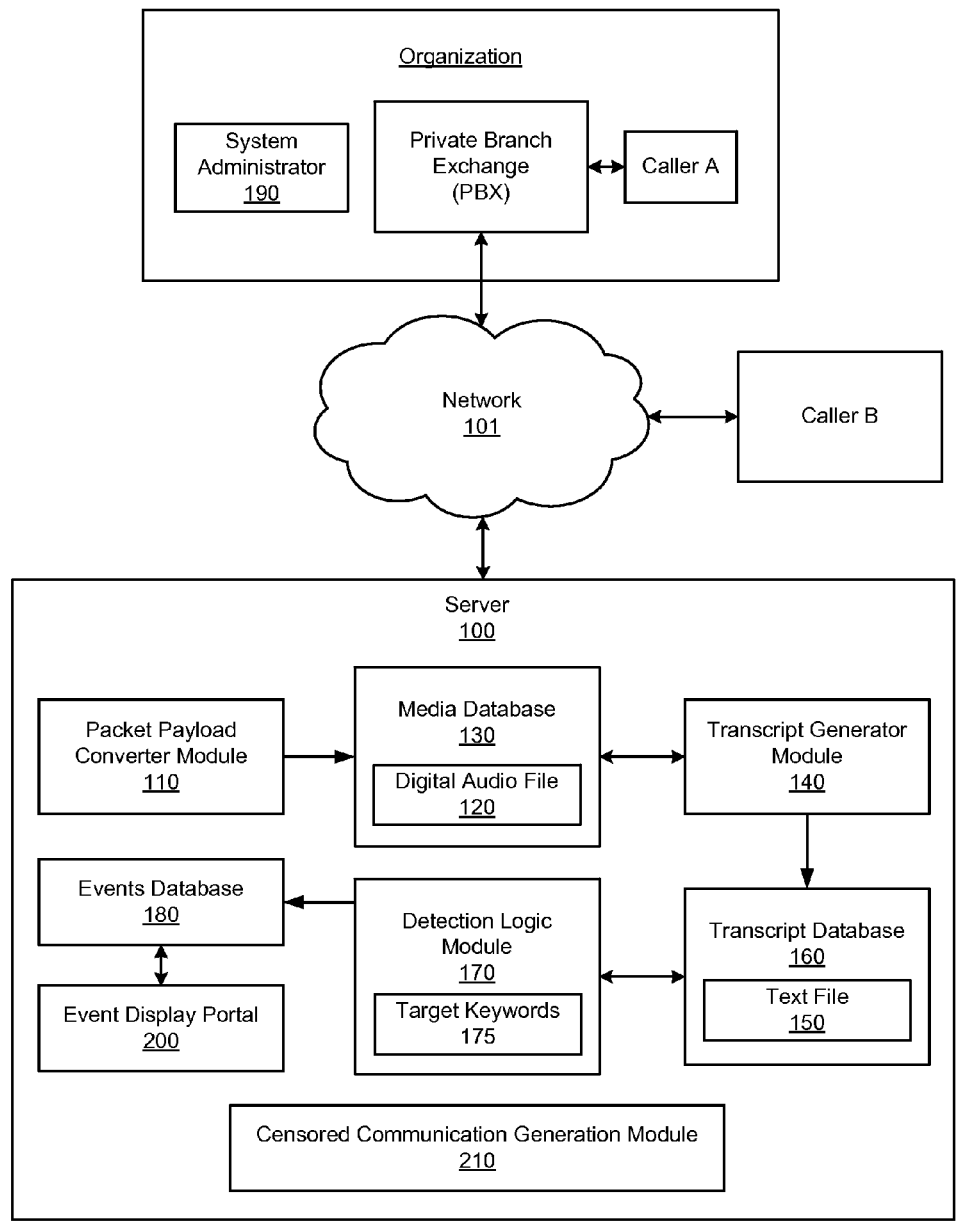
FIG. 2b illustrates a possible embodiment of a system for detecting and preventing voice data leakage.

FIG. 2*b* illustrates a distributed system for detecting and preventing voice data leakage wherein system modules run on a server 100 coupled to the network 101. In this illustrated embodiment, the organization may access the system via the network 101, which may be offered by a third party, perhaps as a subscription service. In one embodiment, the system may be accessible to the organization via a web service running on the server 100 having an application programming interface (API) configured (e.g., programmed) to accomplish the above-described steps responsive to receiving a function call for such service. Such APIs may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof.

Figure 3:
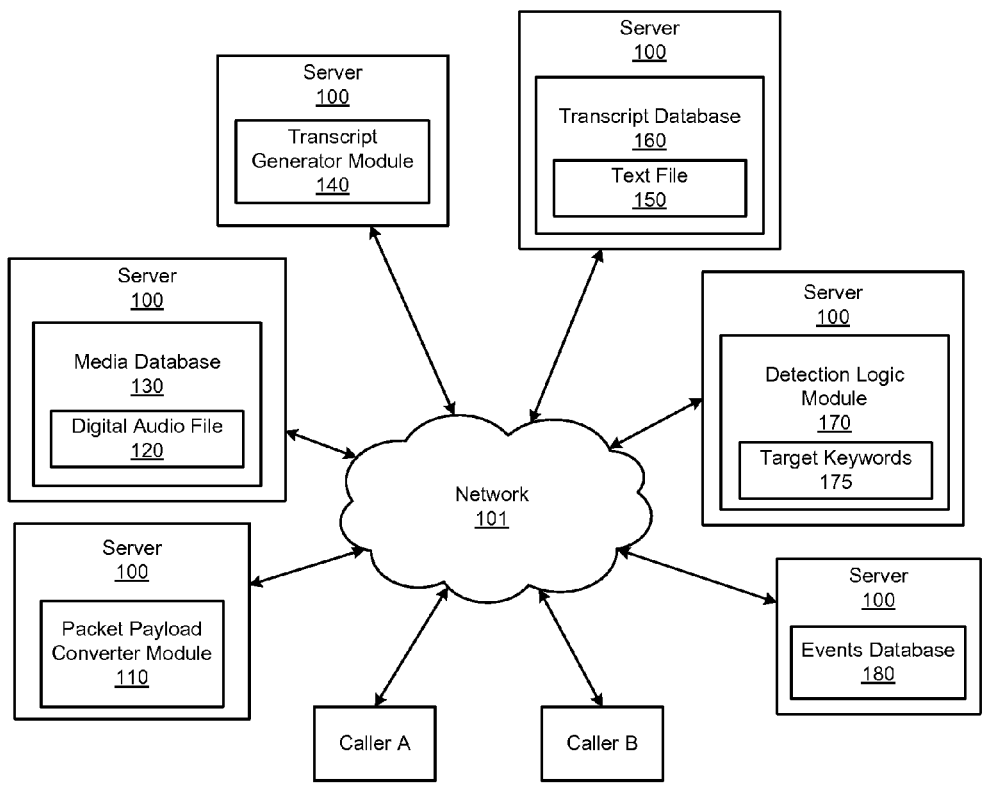
FIG. 3 illustrates a possible embodiment of a system for detecting and preventing voice data leakage.

FIG. 3 illustrates a highly-distributed system for detecting and preventing voice data leakage. As illustrated, the embodiments described herein place no limitation on server 100 configurations or organization. Each module may run on the same server 100, a different server 100, or, alternatively, some modules may run on one server 100 while other modules run on another server 100. Alternatively, each module may comprise a web service having an API configured (e.g., programmed) to accomplish the above-described steps responsive to receiving a function call for such service, perhaps from another module.

Figure 4:
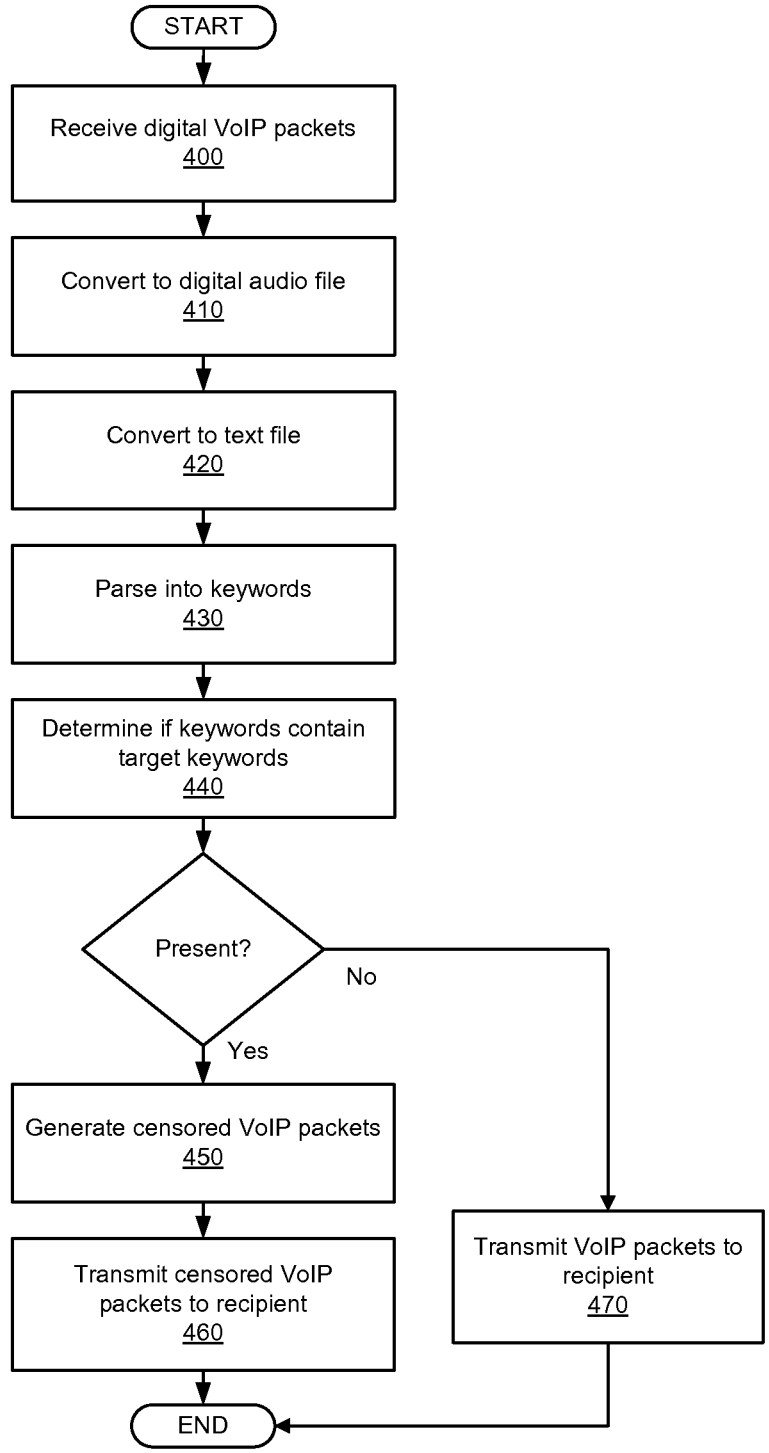
FIG. 4 is a flow diagram illustrating a possible embodiment of a method of detecting and preventing voice data leakage.
Figure 5:
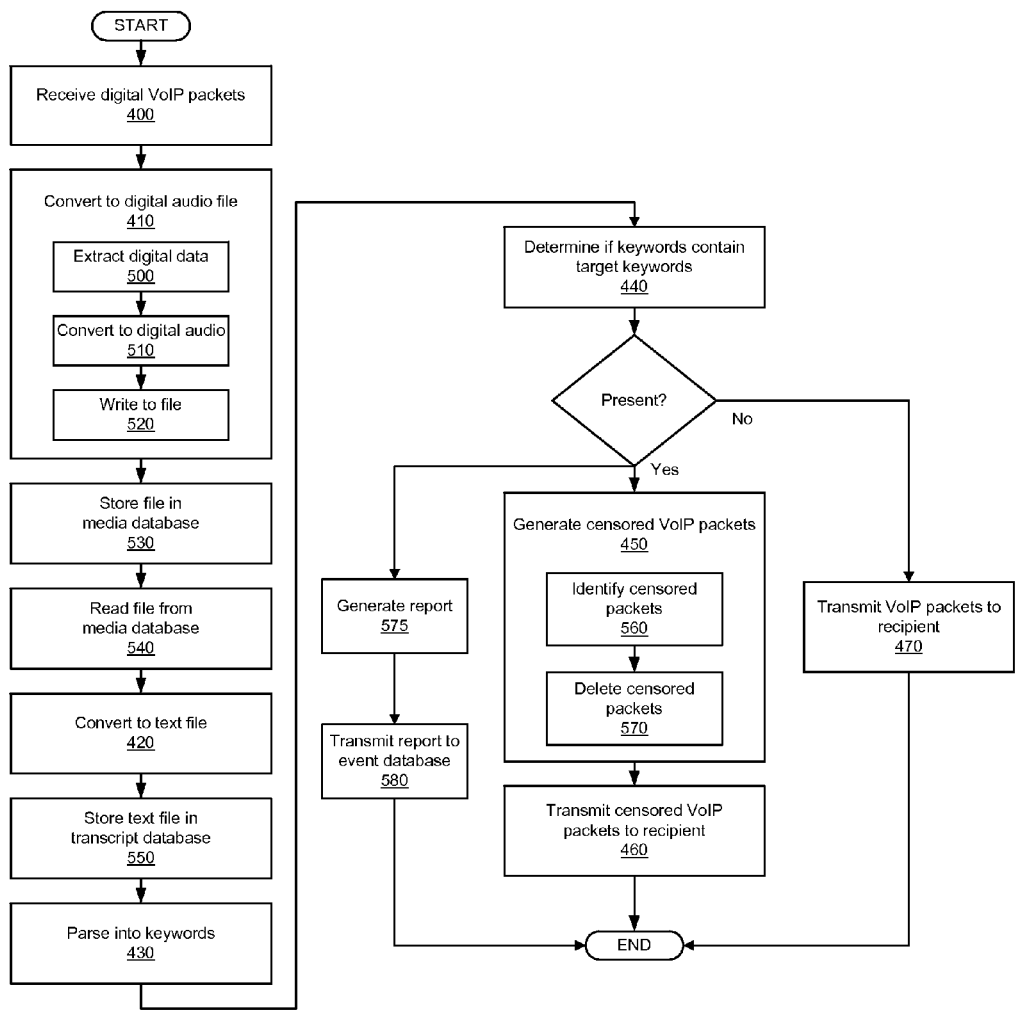
FIG. 5 is a flow diagram illustrating a possible embodiment of a method of detecting and preventing voice data leakage.

As a non-limiting example, the method illustrated in FIGS. 4-5 may be performed by (at least) any central processing unit (CPU) in one or more computing devices or systems, such as a microprocessor running on a server 100 communicatively coupled to a network 101 (e.g., the Internet) and executing instructions stored (perhaps as scripts and/or software) in computer-readable media accessible to the CPU, such as a hard disk drive or solid-state memory on a server 100. Example systems that may be used to perform the methods described herein are illustrated in FIGS. 1-3 and described in detail above.

FIG. 4 is a flow diagram illustrating a possible embodiment of a method of detecting and preventing voice data leakage that may comprise the steps of receiving a plurality of VoIP packets (Step 400), converting the VoIP packets to a digital audio file 120 (Step 410), converting the digital audio file 120 to a text file 150 (Step 420), parsing the text file 150 into a plurality of keywords 175 (Step 430), determining whether the plurality of keywords 175 contains one or more target keywords (Step 440), and, if so, generating a censored plurality of VoIP packets representing the conversation that excludes the one or more target keywords (Step 450) and transmitting the censored VoIP packets to a recipient (Step 460). If the plurality of keywords 175 does not contain one or more target keywords, the VoIP packets may be transmitted to the recipient unaltered (Step 470).

FIG. 5 is a flow diagram illustrating a more detailed possible embodiment of a method of detecting and preventing voice data leakage, wherein Step 410 further comprises the steps of extracting digital audio data from VoIP packets (Step 500) and converting the extracted digital audio data to a digital audio file 120 (Steps 510 and 520). As a non-limiting example, the packet payload converter module 110 may extract the digital audio data from the VoIP packet payloads (Step 500) and reconstruct the conversation by writing the extracted digital audio data to one or more digital audio file 120 (Steps 510 and 520), which may comprise an digital reconstruction of the entire (or part of) the telephone conversation.

As further illustrated in FIG. 5, Step 450 further may comprise identifying the VoIP packets corresponding to each target keyword 175 located in the text file 150 (Step 560) and deleting those packets from the original file (Step 570). As a non-limiting example, steps 450, 560, 570, and 460 may be accomplished by a censored communication generation module 210 configured (e.g., programmed) to generate a censored plurality of VoIP packets that excludes one or more VoIP packets corresponding to said one or more target keywords 175. This may be accomplished by identifying those packets that carried data associated with the target keyword 175 and deleting those packets from the plurality of VoIP packets received by the packet payload converter module 110.

For example, when the packet payload converter module 110 converts the incoming VoIP packets to a digital audio file 120 (Step 410), it may retain in storage the original VoIP packets representing the conversation. The digital audio file 120 may include data (e.g., packet start and end markers for associated payload data) enabling the system to identify the packets associated with various sections of the digital audio file 120. When the detection logic module 170 locates target keywords 175 in the text file 150 (Step 440), the corresponding packets may be located and perhaps deleted (Steps 560 and 570). The system then may transmit the censored plurality of VoIP packets (e.g., without the packets corresponding to the located target keywords 175) to a recipient (Step 460), such as Caller A or B. This process may occur in real time, enabling live censoring of ongoing conversations.

Alternatively, the censored communication generation module 210 may substitute "silent packets" (e.g., properly-addressed packets with no audio payload) for the packets corresponding to the target keywords 175 located in said text file. In such an embodiment the recipient (e.g., Caller A or B) may receive an audio signal wherein the target keywords 170 are not represented (i.e., not heard by the recipient).

The method illustrated in FIG. 5 may further comprises the step of (if target keyord(s) 175 are located in the text file 150) transmitting a report to an event database 180. As described above, the report may comprise any data associated with the identified target keyword 175 including, but not limited to a source phone number, a destination phone number, an internet protocol address, a time, a keyword, an audio file, or the complete text file associated with said conversation from which the text file was generated.

In one example embodiment, a system administrator 190 may access the report stored in the events database 180, perhaps via an event display portal 200 via his client computer, and review report contents (that may include time or date information, the phone numbers of Callers A and B, the IP addresses of their telephones, and/or the located target keyword 175), listen to an audio clip of the portion of the conversation containing the target keyword 175, and/or read the text file.

In one example use of the methods and systems described herein, a system administrator 190 (perhaps a call center MIS manager) may log into an embodiment of the above-described Voice Data Leakage Detection and Prevention System via a password-protected web-based event display portal 200 website running on his organization's server 100 accessible via the Internet. After the system administrator 190 is properly authenticated, the event display portal 200 may display data fields on a webpage in which the system administrator 190 may enter target keywords 175 that he would like monitored. For example, the system administrator 190 may want to be alerted when call center employees discuss customer credit card or social security numbers. In such an example, the system administrator 190 may enter the target keywords "credit card" and "social security" in the event display portal's 200 data fields. The event display portal 200 may also allow the system administrator 190 to enter a time frame before and/or after any target keywords 175 he would like to have censored from the conversation (e.g., 2 seconds) to ensure any information related to a located target keyword is flagged or censored from the conversation.

A call center employee (e.g., caller A in FIG. 2a) may subsequently receive a telephone call from a personal friend (e.g., caller B) who is not an employee of the organization, perhaps with the malicious intent of obtaining customer credit card and social security data to steal a customer's identity. As per known Internet telephony, caller B's incoming telephone phone call may be received by the organization's PBX device and converted to a stream of VoIP packets for transmission to caller A's telephone.

In this example, however, the packet payload converter module 110 of Voice Data Leakage Detection and Prevention System also receives the stream of VoIP packets from the PBX (Step 400). As the conversation between callers A and B continues, the digital audio data from the incoming VoIP packet payloads may be extracted (Step 500) and written to one or more digital audio files 120 (Step 520) stored in the media database 130 (Step 530). Packet header information (e.g., time, date, source and destination IP addresses and phone numbers) may also be stored, perhaps in correlation with the packet payload to allow for speedy reconstruction of the conversation in VoIP format.

The transcript generator module 140 may read the digital audio file (Step 540) from the media database 130 (Step 540) and generate a transcript of the conversation (e.g., one or more text files 150) (Step 420), which may be stored in the transcript database 160 (Step 550). The detection logic module 170 then may read the transcript from the transcript database 160 and determine whether the terms "credit card" or "social security" (i.e., the target keywords 175 set by the system administrator 190) are present in the transcript (Steps 430 and 440).

If those target keywords are located (e.g., caller A says: "customer John Doe would be a good identity to steal, his credit card number is 1234 56789 1234 and his social security number is 123-45-6789"), the system may automatically censor the located target keywords 175 from the conversation by deleting the packets corresponding to the identified target keywords 175 from the stream of VoIP packets, or alternatively, substituting "silent" packets (having no audio data in their payload) for the deleted packets. Thus, continuing with the above example, caller B would hear the following sentence on his telephone: "customer John Doe would be a good identity to steal, his social security number is _____."

Additionally, a report may be generated (Step 575) and transmitted to the events database 180 (Step 580). As described above, the report may comprise any data associated with the identified target keyword 175 including, but not limited to a source phone number, a destination phone number, an internet protocol address, a time, a keyword, an audio file, or the complete text file associated with said conversation from which the text file was generated. Such a report may be accessed by the system administrator 190 logging back into the event display portal 200 and perhaps clicking on a "reports" webpage.

In this example use, the systems and methods described herein prevented sensitive information from being leaked outside the organization and also allowed the system administrator 190 to identify the offending party to take any necessary corrective action.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A system, comprising: one or more server computers communicatively coupled to a network running:
   A) a packet payload converter module configured to:
      i) receive a plurality of VoIP packets;
      ii) convert said plurality of VoIP packets to a digital audio file; and
      iii) write said digital audio file to a media database running on said one or more server computers;
   B) a transcript generator module configured to:
      i) read said digital audio file from said media database;
      ii) convert said digital audio file to a text file; and
      iii) write said text file to a transcript database running on said one or more server computer; and
   C) a detection logic module configured to:
      i) read said text file from said transcript database;
      ii) parse said text file into a plurality of keywords;
      iii) determine whether said plurality of keywords contains one or more target keywords; and
      iv) responsive to a determination that said plurality of keywords contains said one or more target keywords, transmit a report to an events database running on said one or more server computer.

2. The system of claim 1, wherein said plurality of VoIP packets represent a conversation.

3. The system of claim 2, wherein said plurality of VoIP packets comprise a plurality of real-time transport protocol packets.

4. The system of claim 2, wherein said packet payload converter module is configured to convert said plurality of VoIP packets to said digital audio file by:
   a) extracting a plurality of digital audio data from said plurality of VoIP packets; and
   b) converting said plurality of digital audio data to said digital audio file.

5. The system of claim 1, wherein said one or more target keywords are received from a system administrator.

6. The system of claim 5, wherein said one or more target keywords comprise a personally-identifiable information, a credit card number, a social security number, a bank account number, a customer information, a name, an address, a phone number, an organizational secret, a curse word, a trade secret, an illegal activity, an improper activity, a medical information, a financial, or an accounting information.

7. The system of claim 1, wherein said events database is accessible to a system administrator via an event display portal.

8. The system of claim 7, wherein said report comprises a source phone number, a destination phone number, an internet protocol address, a time, a keyword, said digital audio file, or said text file associated with said conversation.

9. The system of claim 2, further comprising:
   D) a censored communication generation module configured to:
      i) generate a censored plurality of VoIP packets that excludes one or more VoIP packets corresponding to said one or more target keywords; and
      ii) transmit said censored plurality of VoIP packets to a recipient.

10. The system of claim 9, wherein said censored communication generation module is configured to generate said censored plurality of VoIP packets by:
    a) identifying one or more VoIP packets corresponding to each of said one or more target keywords located in said text file; and
    b) deleting said one or more VoIP packets corresponding to each of said one or more target keywords located in said text file from said censored plurality of VoIP packets.

11. The system of claim 10, wherein said censored communication generation module is configured to substituting one or more silent packets for said one or more VoIP packets corresponding to each of said one or more target keywords located in said text file.

12. A system, comprising: one or more server computers communicatively coupled to a network configured to:
    A) receive a plurality of VoIP packets;
    B) convert said plurality of VoIP packets to a digital audio file;
    C) convert said digital audio file to a text file;
    D) parse said text file into a plurality of keywords;
    E) determine whether said plurality of keywords contains one or more target keywords entered by a system administrator; and
    F) responsive to a determination that said plurality of keywords contains said one or more target keywords:
       i) generate a censored plurality of VoIP packets that excludes one or more VoIP packets corresponding to said one or more target keywords; and
       ii) transmit said censored plurality of VoIP packets to a recipient.

13. The system of claim 12, wherein said plurality of VoIP packets represent a conversation.

14. The system of claim 13, wherein said plurality of VoIP packets comprise a plurality of real-time transport protocol packets.

15. The system of claim 13, wherein said one or more server computers is further configured to convert said plurality of VoIP packets to said digital audio file by:
    i) extracting a plurality of digital audio data from said plurality of VoIP packets; and ii) converting said plurality of digital audio data to a plurality said digital audio file.

16. The system of claim 15, wherein said one or more server computers is further configured to store said digital audio file in a media database running on said one of more server computers.

17. The system of claim 16, further comprising a transcript generator module running on said one or more server computers configured to read said digital audio file from said media database, convert said digital audio file to said text file, and store said text file in a transcript database running on said one or more server computers.

18. The system of claim 12, wherein said one or more target keywords are received from a system administrator.

19. The system of claim 18, wherein said one or more target keywords comprise a personally-identifiable information, a credit card number, a social security number, a bank account number, a customer information, a name, an address, a phone number, an organizational secret, a curse word, a trade secret, an illegal activity, an improper activity, a medical information, a financial, or an accounting information.

20. The system of claim 12, where said one or more server computers are further configured to: transmit a report to an events database running on said one or more server computers.

21. The system of claim 20, wherein said report comprises a source phone number, a destination phone number, an internet protocol address, a time, a keyword, said digital audio file, or said text file associated with said conversation.

* * * * *